S. STROUP.
TROLLEY GUARD.
APPLICATION FILED AUG. 18, 1908.
936,055.
Patented Oct. 5, 1909.
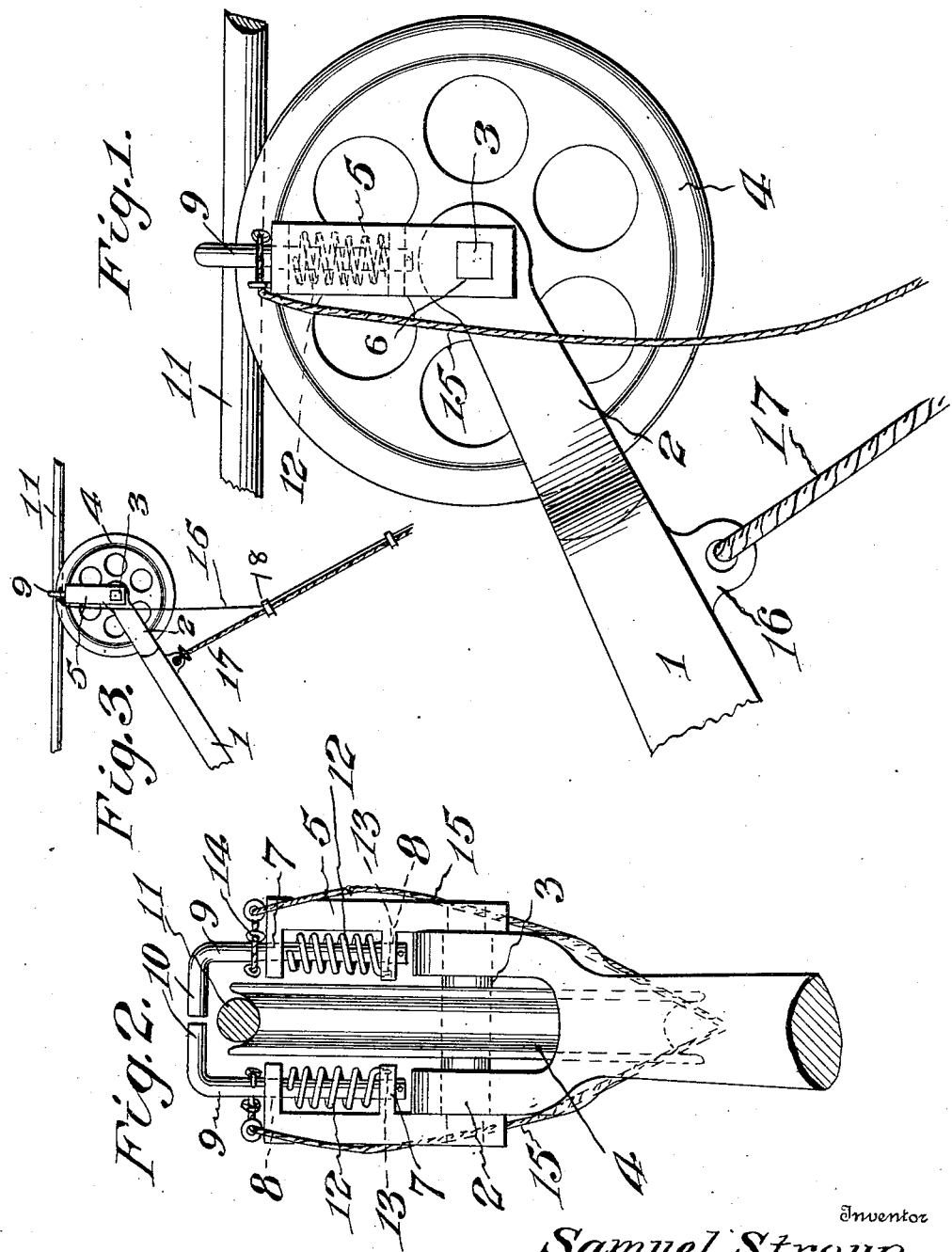
Witnesses
Joe. P. Wahler,
C. Bradway.
Inventor
Samuel Stroup.
By Victor J. Evans.
Attorney

UNITED STATES PATENT OFFICE.

SAMUEL STROUP, OF PERU, INDIANA.

TROLLEY-GUARD.

936,055.  Specification of Letters Patent.  Patented Oct. 5, 1909.

Application filed August 18, 1908. Serial No. 449,162.

*To all whom it may concern:*

Be it known that I, SAMUEL STROUP, a citizen of the United States, residing at Peru, in the county of Miami and State of Indiana, have invented new and useful Improvements in Trolley-Guards, of which the following is a specification.

This invention relates to trolleys for electric cars and more particularly to a retaining device for maintaining the trolley wheel in contact with the overhead electric conductor.

The invention has for one of its objects to improve and simplify the construction and operation of devices of this character so as to be comparatively simple and inexpensive of manufacture to install, thoroughly reliable and efficient in use and readily manipulated when it is desired to remove the trolley wheel from or replace it on the overhead wire.

A further object of the invention is the provision of a trolley guard including guard members or retainers normally disposed over the top of the wire for preventing the wheel from leaving the latter and which members are so arranged as to yield rearwardly upon the engaging hanger, bracket or other support for the cross wires and the like of the overhead trolley wire suspension system, the said parts being connected with a cord or equivalent means for enabling the conductor to throw the members outwardly when it is desired to remove the trolley wheel from the wire or replace the wheel.

With these and other objects in view as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention:—Figure 1 is a side view of the trolley wheel and car. Fig. 2 is a front view thereof. Fig. 3 is a side view of the device showing the releasing cord for disengaging the guard members.

Similar reference characters are employed to designate similar parts in the several figures.

Referring to the drawing, 1 designates an ordinary trolley pole which is provided with a harp 2 that carries the axle 3 on which the grooved trolley wheel 4 rotates. The ends of the axle project from opposite sides of the trolley harp and are of square cross section as shown in Fig. 1 and on these non-circular extremities of the axle are mounted upright members or supports 5 that have non-circular openings 6 for fitting on the axle extremities. These members are disposed at opposite sides of the wheel 4 and are formed each with inwardly extending lugs 7 that are provided with vertical apertures 8 in which are mounted the guard members 9. These members project above the wheel and are bent inwardly to form hook-like extremities 10 that project toward each other and meet at a point centrally above the overhead wire 11. The members 9 are mounted to turn and are held against longitudinal movement. On each member 9 is a torsional spring 12 disposed between the lug 7 and having one end engaged in an opening in the lower lug and the upper end fastened in an opening in the member 9, the spring serving to hold the member in such position that the upper end 10 will extend transversely to and project over the overhead wire 11. The members 9 are provided with pins 14 to which the upper ends of the branches 15 of a retrieving cord 16 is attached, the cord 16 extending downwardly along the usual trolley rope 17 and passing through rings 18 on such rope. The lower end of the retrieving cord 16 is then within reach of the conductor so that the guard members or retaining devices 10 can be retracted.

In practice the parts are in the position shown in the drawings and the trolley wheel is maintained by the guard members in operative relation with the trolley wires and when the hangers, brackets and the like are contracted the guard members 10 yield rearwardly until they pass the hangers, brackets and the like and then return to their normal position. When it is desired to remove the trolley wheel from the wire, the conductor first pulls on the cord 16 so as to turn the guard members for throwing the upper extremities 10 thereof outwardly to opposite sides of the trolley wire and while held in this position the trolley pole rope 7 is pulled downwardly removing the wheel from the wire. In replacing the wheel, the members 10 are held retracted by pulling on the cord 16 and the wheel is guided back to the trolley wire in the usual manner, by means of a rope 17, while the draft is maintained on the cord 16. After the wheel is again in contact with the trolley wire, the cord 16 is released so that the guard members will automatically engage over the trolley wire.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired, as are within the scope of the claims.

Having thus described the invention, what is claimed as new, is:—

1. The combination of a trolley pole and harp, said harp having openings, an axle mounted in the openings and having non-circular ends projecting from opposite sides of the harp, a trolley wheel mounted on the axle, upright supporting members having non-circular openings for fitting on the ends of the axle and said members projecting upwardly above the harp at opposite sides of the trolley wheel, apertured lugs on the members, L-shaped retaining elements having vertically-disposed arms mounted in the apertured lugs for rotary movement and arranged with their other arms disposed horizontally over the trolley wheel, a torsional spring arranged on each of the L-shaped elements and disposed between the said lugs of each member and adapted to yieldingly hold the elements with their horizontal members extending transversely over the wheel, a cord connected with each element for turning the same, guides on the members for the cords, and a single pull cord connected with the first-mentioned cord.

2. The combination of a trolley pole, a harp, an axle on the harp, a wheel mounted on the axle, supporting members disposed at opposite sides of the harp and having inwardly projecting lugs provided with vertical apertures, guard members mounted in the apertures to turn and having their upper ends bent inwardly over the trolley wheel to retain the latter on the trolley wire, torsional springs each disposed between the lugs of each supporting member and fastened to one lug and to the guard members, and means connected with both guard members for retracting the same to remove the wheel from the trolley wire.

In testimony whereof I affix my signature in presence of two witnesses.

SAMUEL STROUP.

Witnesses:
   B. F. WEIMER,
   C. R. PRIOR.